June 12, 1962  E. N. PENNINGTON ET AL  3,038,788
EMERGENCY SHUTDOWN PROCESS AND SYSTEM FOR CARBON BLACK PLANT
Filed Dec. 7, 1959
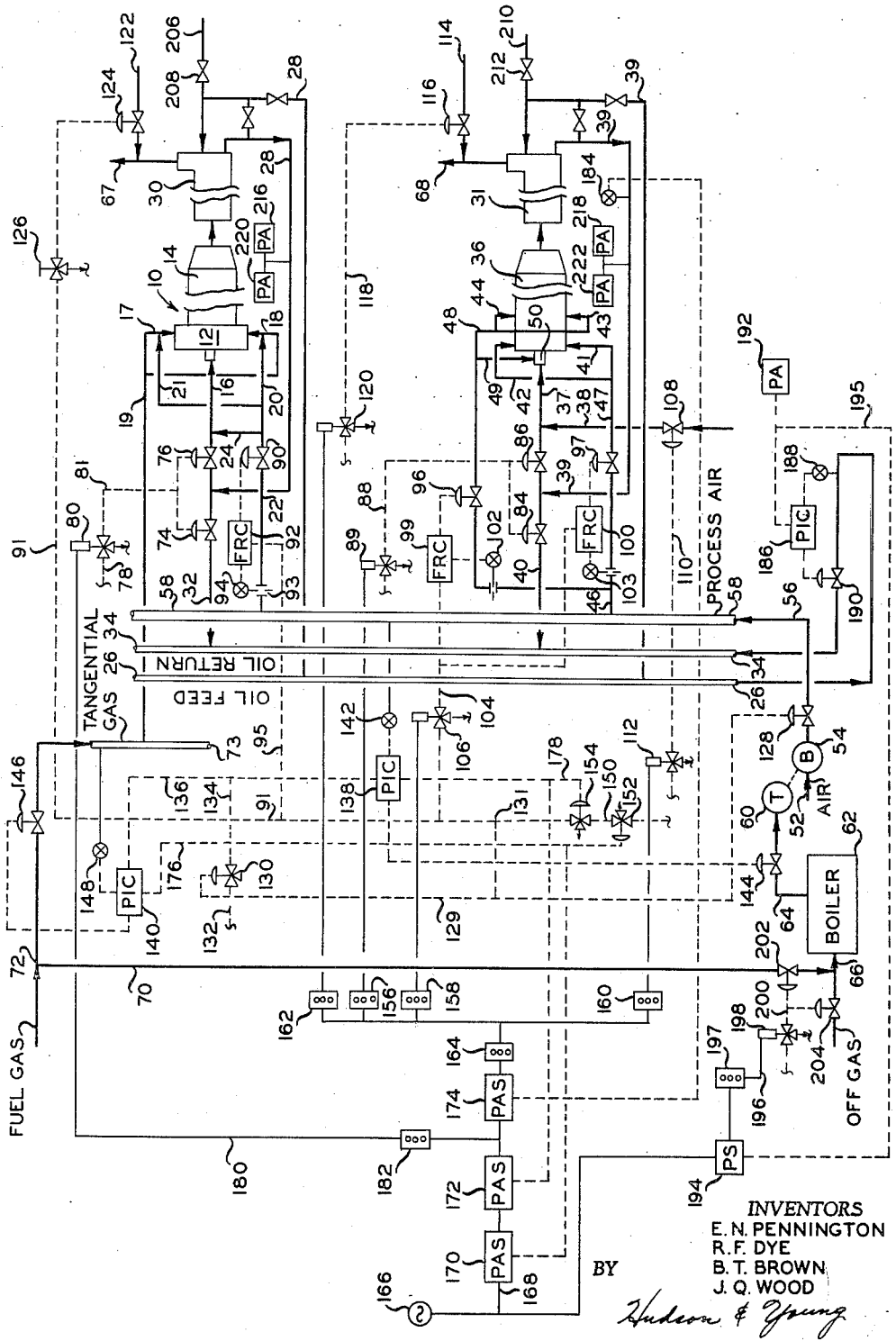
INVENTORS
E. N. PENNINGTON
R. F. DYE
B. T. BROWN
J. Q. WOOD
BY
Hudson & Young
ATTORNEYS

United States Patent Office 3,038,788
Patented June 12, 1962

3,038,788
EMERGENCY SHUTDOWN PROCESS AND
SYSTEM FOR CARBON BLACK PLANT
Edward N. Pennington, Robert F. Dye, Byron T. Brown, and James Q. Wood, Bartlesville, Okla., assignors to Phillips Petroleum Company, a corporation of Delaware
Filed Dec. 7, 1959, Ser. No. 857,949
6 Claims. (Cl. 23—259.5)

This invention relates to a safety system and shut-down process for use in a carbon black plant simultaneously producing more than one type of carbon black.

Carbon black is produced on a commercial scale in various types of reactors or furnaces under different process conditions to produce different types of black for specific applications. In producing one type of black tangential air and fuel gas are burned in a cylindrical precombustion chamber of relatively large diameter and relatively short length to produce a spiraling blanket of hot combustion gas along the inner wall of a contiguous cylindrical reaction chamber of relatively small diameter and substantially greater length than diameter. The hydrocarbon feed, preferably an oil of high BMCI value, is injected axially thru the precombustion chamber with axial air into the reaction chamber where it is converted to carbon black by incomplete combustion. "Philblack O," a high abrasion furnace black, and "Philblack I," an intermediate super abrasion furnace black are produced in this type of reactor. Carbon black is also manufactured in another type of reactor of uniform internal diameter in which air is injected tangentially at spaced ports along the feed end of the reactor, without any injection of fuel gas, and the hydrocarbon feed (oil) is injected axially into the reactor thru an atomizing nozzle along with atomizing air under relatively high pressure. "Philblack A," a fast extrusion furnace black, is made in this type of reactor. A carbon black plant designed to produce these types of black is disclosed in the copending application of Robert F. Dye, S.N. 840878, filed September 18, 1959.

U.S. Patent 2,883,271 of Pennington et al. discloses and claims a safety system for automatic shutdown in a carbon black plant utilizing a single type of reactor. This invention is an improvement over such a system wherein more than one type of carbon black reactor is producing carbon black with different process requirements in the different types of reactors.

Accordingly, it is an object of the invention to provide an improved process and arrangement of apparatus for automatic shutdown of a carbon black plant under emergency conditions. Another object is to provide a shutdown process and system which prevents explosion in the equipment of a carbon black plant. A further object is to provide a process and arrangement of apparatus in a carbon black plant which maintains one type of reactor in heated condition for immediate resumption of operation when another type in the plant is completely shut down. It is also an object of the invention to provide an improved safety shutdown system and process for use in a carbon black plant producing different types of black which reduces maintenance costs, insures safe and sure response in the event of failure of process supplies, and effects plant safety. Other objects and advantages of the invention will become apparent upon consideration of the accompanying disclosure.

One aspect of the invention comprises an interlocking system of automatic controls which shuts down carbon black furnaces and purges the effluent gas lines from two types of furnaces making two types of black in the event of failure of electric power supply or essential units of operating equipment. When electric power fails, one type of reactor is completely shut down and the other type is maintained in heated condition by continuing the supply of fuel gas and air thru the tangential ports of the reactor. The smoke header of the completely shutdown reactor is purged with inert gas to prevent explosion hazard. Upon failure of the fuel gas supply for tangential injection to one reactor both reactors are completely shut down, as is the case when there is a failure in the process air supply. One type of reactor utilizes an atomizing nozzle for injecting an atomized oil axially into the reactor under the pressure of atomizing air. When this nozzle fails, the system cuts off the oil feed and recycles the same, shuts down air flow to the nozzle and tangential air to this reactor, only, without interfering in any way with the operation of the other type reactor. When there is a conversion oil supply failure the second type of reactor is completely shut down while only an alarm is sounded on the first type of reactor.

Other process variations are effected by the automatic shutdown system which will be more fully described hereinafter in connection with the accompanying schematic flow diagram showing an arrangement of apparatus and controls in accordance with the invention. Referring to the drawing, one type of reactor 10 has an enlarged precombustion section 12 and a smaller diameter reaction section 14. This reactor is provided with an axial oil feed line 16, tangential fuel gas feed lines 17 and 18 from a common supply line 19, and tangential air lines 20 and 21 connected with a common air supply line 22. An axial air line 24 connects with fuel line 16 and air supply line 22 which in turn connects with header 58. Conversion oil is supplied from a header 26 thru line 28 which passes thru heat exchanger 30 in the effluent smoke line downstream of the reactor. Line 28 passes from the heat exchanger into feed line 16. Under emergency conditions, oil is passed from line 28 to return or recycle line 32 to header 34 for return to the oil source (not shown).

A second type of reactor 36 having a cylindrical reaction chamber of uniform diameter is provided with an axial oil line 37 into which atomizing air is injected thru line 38. Oil injection line 37 is connected with oil supply header 26 by means of line 39 and with oil return header 34 by means of oil return line 40. Tangential air is introduced to the reactor from lines 41 and 42 thru a first set of tangential ports and thru lines 43 and 44 thru a second set of tangential ports downstream of the first set. Process air supply line 46 connects with branch lines 47 and 48 which supply the tangential air inlet lines 41, 42, 43, and 44. Axial air line 49 connects line 48 with atomizing air nozzle inlet 50.

Process air for both types of reactors is supplied to lines 22 and 46 from air line 52 by blower 54. Air line 56 connects blower 54 with process air header 58 to which process air lines 22 and 46 connect. Blower 54 is operated by steam turbine 60 which receives steam from boiler 62 via line 64. Under normal operating conditions boiler 62 is fired by burning off-gas introduced thru line 66 from bag filters in the carbon black collection system (not shown) downstream of effluent smoke lines 67 and 68. When off-gas is not available because of the shut down of the reactors, fuel gas is supplied to line 66 via line 70 which connects with gas supply line 72. Gas supply line 72 connects with tangential gas header 73 which connects with supply line 19 for the tangential gas feed lines to reactor 10 and also supplies other reactors of this type in the plant.

An air operated motor valve 74 in oil return line 32 and a similar valve 76 in axial oil injection line 16 downstream of the oil return line control the flow of oil either thru the return line or to the reactor. During normal operation with reactor 10 on stream, valve 76 is open and valve 74 is closed by instrument air pressure supplied from instrument air line 78 which operates thru solenoid operated valve 80. This valve, when electrically actuated, is open from the supply line 78 to line 81, thereby maintaining instrument air pressure on valves 74 and 76. Upon cutting off current to valve 80, the solenoid reverses and allows instrument air from line 81 to bleed from the valve and shut off the instrument air from line 78.

A similar arrangement of air-operated motor valves 84 and 86 in the oil return and oil injection lines 40 and 37, respectively, is provided. Motor valve 86 is normally open and 84 is normally closed by instrument air pressure supplied thru line 88 under the control of solenoid operated valve 89 in the same manner as valve 80 which controls oil flow thru valves 76 and 74.

Flow of process air thru line 22 to the axial and tangential air lines feeding reactor 10 is controlled by air-operated motor valve 90 which is controlled by flow recorder controller 92. This controller is sensitive to the flow rate across orifice 93 sensed and transmitted by transmitter 94. Instrument 92 is connected with an instrument air supply header 91 by means of line 95.

Flow of tangential and axial air to reactor 36 is controlled by a pair of air-operated motor valves 96 and 97, controlled by flow recorder controllers 99 and 100, respectively, which are responsive to transmitters 102 and 103, respectively. Controllers 99 and 100 are supplied with instrument air from header 91 thru line 104 in which solenoid operated 3-way valve 106 is positioned such that instrument air flows to the controller.

Atomizing air supplied from line 38 to oil line 37 is controlled by means of air-operated motor valve 108 which is normally open. Instrument air is supplied to this valve thru line 110 thru solenoid-operated 3-way valve 112.

Purge steam or other inert gas introduced to smoke line 68 downstream of heat exchanger 31 thru line 114 is controlled by air-operated motor valve 116. Air is supplied to this valve via line 118 to maintain it in closed position. Solenoid-operated 3-way valve 120 in line 118 admits air to valve 116 to keep it closed.

Purge steam or other inert gas flowing into smoke line 67 downstream of heat exchanger 30 thru line 122 is controlled by air-operated motor valve 124. This valve is maintained in closed position by instrument air admitted by hand- (or air-) operated 3-way valve 126 which connects with air header 91 so that cutting off air pressure in line 91 also operates valve 126 to bleed pressure off valve 124.

Flow of air from blower 54 to process air header 58 is controlled by air-operated motor valve 128 in line 56. Valves 128 and 130 are connected by air line 129 to instrument air header 91. Valve 130 is normally open from instrument air supply line 132 to line 134 and supplies instrument air to line 136 connected to pressure controllers 138 and 140. Pressure controler 138 is responsive to pressure in process air header 58 transmitted by transmitter 142 and controls motor valve 144 in line 64, closing this valve to shut off steam when pressure in header 58 falls below a desired minimum.

Flow of fuel gas thru line 72 to header 73 is controlled by air operated motor valve 146. Pressure controller 140 regulates the pressure in header 73 since it is responsive to pressure transmitter 148, and is in control of valve 146. Controller 140, when actuated by instrument 148, bleeds instrument air from lines 176 when pressure in header 73 falls below the desired minimum and opens 3-way motor valve 152 to bleed, thus bleeding air from line 150. Loss of pressure in instrument air line 150 also bleeds air from instrument air header 91 thru valve 154. Since air line 129 connects with air header 91 at 131, bleeding of air from header 91 also relieves pressure in air line 129, thus causing valve 130 to switch to bleed position which in turn bleeds line 134, inactivating controllers 138 and 140. By this arrangement of controls, valves 130, 154, and 152 in the instrument air supply to pressure controllers 138 and 140 are tied together so that failure in either the process air supply or in the fuel gas supply has the effect of cutting off the flow of air thru valve 128 in the process air line, valve 146 in the tangential fuel gas supply line and operates valve 124 in purge gas line 122.

An electrical control system is provided which operates in conjunction with the instrument air pressure control system to perform certain shut down steps automatically. The solenoids of valves 89, 106, 112, and 120 are connected in parallel thru hand-operated reset switches 156, 158, 160, and 162, respectively, thru a single hand-operated reset switch 164 with an electric power source 166 thru a circuit 168. Pressure alarm switches 170, 172, and 174 are positioned in series in this circuit. In normal operation these switches are closed so that current passes therethru to the various solenoids in the circuit. Switch 170 is connected by instrument air line to the instrument air line 176 connecting motor valve 152 and pressure controller 140. When instrument air is bled from line 176 by pressure controller 140, the instrument air pressure on switch 170 is bled off so as to de-energize the solenoids in valves 106, 89, 120, and 112, thereby cutting off the flow of tangential air to reactor 36, switching conversion oil to recycle from line 39 to line 40, purging the effluent smoke line 68 with steam thru valve 116, and cutting off the flow of atomizing air by reversing valve 108. Opening of switch 170 also de-energizes valve 80 which switches oil on reactor 10 to recycle. A moment later, due to bleed down of line 91, valve 124 in purge line 122 opens. Pressure switch 172 is connected by an air line with instrument air line 178 connecting motor valve 154 with pressure controller 138. This switch operates upon failure of process air in a similar manner to the operation of switch 170 upon failure of tangential fuel gas.

A second electric circuit 180 connects with circuit 168 between pressure switches 172 and 174 and with the solenoid of the valve 80 thru hand-operated reset switch 182 so that operation of either switch 170 or 172 also de-energizes the solenoid of valve 80 to throw conversion oil into recycle by closing valve 76 and opening valve 74 upon failure of either process air or fuel gas.

Pressure switch 174 is responsive to pressure in the conversion oil feed line 39 leading to axial oil injection line 37. When oil pressure in line 39 falls below a selected minimum or raises above a selected maximum, pressure switch 174 is operated by a signal from transmitter 184. When switch 174 opens and cuts off the flow of current to the solenoids of valves 106, 89, 120, and 112 the flow of air (tangential, axial, and atomizing) to reactor 36 is cut off, the oil to this reactor is put on recycle, and purge steam is introduced to smoke line 68, without any effect on reactor 10 since circuit 180 takes current thru switches 170 and 172 but not thru switch 174. Excess pressure can be caused in oil line 39 by plugging of the atomizing nozzle connected with tube 50. This plugging sometimes occurs because of the formation of carbon in the orifices of the nozzle. Another failure occurs when the atomizing nozzle is burned out so as to greatly decrease the pressure drop across this element, thereby lowering the pressure in line 39 below the required minimum, both of which failures actuate pressure switch 174 to shut down the supply of material to reactor 36 without interfering with the operation of reactor 10.

Another aspect of the control system comprises a pressure controller 186 responsive to pressure transmitter 188 in oil supply header 26 and in control of motor valve 190 in a line from supply header 26 to return header 34. A pressure alarm 192 is connected with pressure controller 186. This alarm sounds when oil pressure in header 26 falls below a desired minimum. When this occurs pressure switch 194 is actuated thru instrument air line 195. Pressure switch 194 is in circuit 196 which leads from power source 166 to a 3-way solenoid-operated valve 198 in an instrument air line 200. When switch 194 de-energizes the solenoid of valve 198, instrument air to motor valves 202 and 204 is bled off thereby reversing these valves so that off-gas is cut off and natural gas (or other fuel gas) is passed thru line 70 into line 66 to feed the burners of boiler 62. This is essential to the operation of the plant in view of the fact that there is no off-gas production from the bag filters downstream of the reactors when supply of conversion oil fails. In this manner, natural gas or other fuel gas is supplied to the boiler burners to maintain steam supply until pressure of conversion oil is restored.

In order to prevent carbon laydown in heat exchangers 30 and 31, a steam purge line 206 containing hand-operated valve 208 is connected with oil line 28 upstream of heat exchanger 30 to provide for purging the hot oil lines when desired to prevent carbon laydown. A similar arrangement of line 210 and valve 212 for oil line 39 leading to heat exchanger 31 is provided. High pressure alarms 216 and 218 and low pressure alarms 220 and 222 on the oil injection lines 16 and 37, respectively, are provided to alert the plant personnel.

A summary of emergency conditions and shut-down responses is presented below.

A. Electric power failure:
   (1) Fuel gas is turned on at boiler 62 by valve 202 and valve 204 is closed.
   (2) Conversion oil to both reactors is switched from reactor to recycle by reversing valves 74, 76, 84, and 86.
   (3) Air flow control valves 96 and 97 are closed cutting off process air to reactor 36.
   (4) Atomizing air is shut off by closing valve 108.
   (5) Smoke line 68 is purged with steam by opening valve 116.
B. Tangential fuel gas supply failure (reactor 10):
   (1) Conversion oil is switched from reactor to recycle by reversing valves 74, 76, 84, and 86.
   (2) Smoke lines 67 and 68 are purged with steam by opening valves 124 and 116.
   (3) Air flow control valves 90, 96, and 97 are closed cutting off flow of process air to both reactors.
   (4) Motor valve 128 in process air line is closed.
   (5) Steam turbine 60 is shut down by closing motor valve 144.
   (6) Motor valve 146 in fuel gas line is closed.
   (7) Atomizing air to reactor 36 is cut off by closing motor valve 108.
C. Process air supply failure: The responses are the same as for B. (Fuel gas supply failure.)
D. Failure of conversion oil atomizing nozzle on reactor 36:
   (1) Conversion oil is switched from reactor 36 (only) to recycle by reversing valves 84 and 86.
   (2) Smoke line 68 is purged with steam by opening motor valve 116.
   (3) Atomizing air is shut off by closing of motor valve 108.
   (4) Air flow control valves 96 and 97 are closed.
E. Conversion oil supply failure (indicated by pressure controller 186):
   (1) For reactor 10, alarms 192 and 220 are sounded, only.
   (2) For reactor 36, responses are the same as for atomizing nozzle failure on this reactor.
   (3) Fuel gas is turned on at steam boiler 62 by opening motor valve 202 and closing motor valve 204.

The normal plant operating conditions are well known in the art and are not a part of the invention. However, atomizing air pressure is usually maintained in the range of 75 to 125 p.s.i.g. and preferably at about 100 p.s.i.g. Process air pressure is maintained in the range of about 2 to 6 p.s.i.g. and preferably at about 3 p.s.i.g. The pressure of tangential fuel gas is maintained in the range of about 20 to 50 p.s.i.g., preferably at about 30 p.s.i.g., and that in the oil supply header is maintained in the range of about 50 to 190 p.s.i.g.

Certain modifications of the invention will become apparent to those skilled in the art and the illustrative details disclosed are not to be construed as imposing unnecessary limitations on the invention.

We claim:

1. In a carbon black plant comprising a first reactor having a fuel gas line for injecting fuel gas from a fuel gas supply line tangentially into said first reactor, a first air supply line for injecting air from a source thereof tangentially and axially into said first reactor, a first oil supply line for injecting conversion oil axially from an oil source into said first reactor, and first effluent smoke conduit means leading to first carbon black collection means, a second reactor having second air supply lines for injecting air from said source thereof into said second reactor, a second oil supply line for injecting conversion oil from said oil source axially into said second reactor, and second effluent smoke conduit means leading to second carbon black collection means; a saftey system comprising a first recycle line connecting said first oil supply line at a point upstream of said first reactor with said source of oil having a normally closed first motor valve therein; a normally open second motor valve in said first oil supply line between aforesaid point, and said first reactor; corresponding second oil recycle line and third and fourth motor valves connected with said second oil recycle line and second oil supply line, respectively; normally open motor valve means in said second air supply lines; flow rate sensing means in said second air supply lines; flow controller means actuated by said flow rate sensing means and actuating said motor valve means to maintain a selected flow rate therein; an atomizing air line connected with said second oil line adjacent said second reactor having a normally open fifth motor valve therein; a purge gas line connected with said second effluent smoke conduit means having a normally closed sixth motor valve therein; an instrument air header; a first air line from said instrument air header to said flow controller means; a first solenoid-operated 3-way valve in said first air line; a second solenoid-operated 3-way valve in control of said third and fourth motor valves; a third solenoid-operated 3-way valve in control of said sixth motor valve; a fourth solenoid-operated 3-way valve in control of said fifth motor valve; a first circuit from an electric power source, the solenoids of said 3-way valves being connected therein in parallel; a first pressure switch in said first circuit intermediate said solenoids and said power source sensitive to the oil pressure in said second oil supply line, whereby pressure therein outside of a selected range operates said first pressure switch to de-energize said solenoids and reverse said motor valve means and said third, fourth, fifth, and sixth motor valves.

2. The system of claim 1 including an oil header connecting with and supplying oil to said first and second oil supply lines; pressure sensing means connected with said header; blower means connected by conduit means with said first and second air supply lines; a steam turbine connected with said blower means for rotation thereof; a steam boiler connected by a steam line with said turbine; a fuel gas feed line leading into said boiler; a gas conduit connecting said fuel gas supply line with said feed line having a normally closed seventh motor valve therein; a carbon black recovery off-gas line connected with said fuel gas feed line having a normally open eighth motor valve therein; a fifth solenoid-operated 3-way valve operatively connected with said seventh and eighth motor valves; a second pressure switch in a second circuit with an electric power source operatively connected with said pressure sensing means on said oil header to actuate said fifth solenoid and reverse said seventh and eighth motor valves when pressure in said oil header varies from a selected range.

3. The system of claim 2 including a process air header in said conduit means connected with said first and second air supply lines and with said blower; a normally open ninth motor valve in said conduit means upstream of said air header; a first pressure controller responsive to the pressure in said air header operatively connected with said ninth motor valve; a normally open tenth motor valve in the steam line to said turbine operatively connected with said first pressure controller; a normally open eleventh motor valve in said fuel gas supply line downstream of said gas conduit; a second pressure controller responsive to the pressure in said fuel gas supply line in operative control of said eleventh motor valve, said first and second pressure controllers being operatively connected so that each operates the other when actuated.

4. In a carbon black plant comprising a first reactor having a tangential fuel gas line connected with a fuel gas supply line, a first air supply line connected tangentially and axially with said first reactor and with a process air header, a first axial oil supply line connected with an oil supply header, a first effluent smoke line leading to first carbon black collection means; a second reactor having second air supply lines connected tangentially and axially therewith and with said process air header having motor valve control means therein, a second axially oil supply line connected with said oil supply header, a second effluent smoke line leading to a second carbon black collection means, and an axial atomizing air line having a normally open fifth motor valve therein; a safety system comprising a first recycle oil line leading to a return oil header from said first axial oil supply line having a normally closed first motor valve therein; a normally open second motor valve in said first oil supply line downstream of said first recycle oil line; a corresponding second oil recycle line connected between said second oil supply line and said oil supply header and third and fourth motor valves in said second oil recycle line and said second oil supply line, respectively; a purge gas line connected with said second effluent smoke line having a normally closed sixth motor valve therein; flow rate controller means operatively connected with said motor valve control means, first, second, third, and fourth solenoid-operated reversing means operatively connected, respectively, to said flow rate controller means, to said third and fourth motor valves, to said sixth motor valve, and to said fifth motor valve; a source of electric current; a first pressure switch in circuit with said power source, said first, second, third, and fourth solenoids being connected in parallel in said circuit to operate simultaneously under the control of said pressure switch; and pressure sensing means in said second oil supply line connected with said pressure switch, whereby oil pressure outside of a selected range or power failure cuts off flow of current and operates said first, second, third, and fourth solenoids.

5. The system of claim 4 including an oil pressure sensing means on said oil supply header; blower means connected by conduit means with said first and second air supply lines; a steam turbine connected with said blower means for rotation thereof; a steam boiler connected by a steam line with said turbine; a fuel gas feed line leading into said boiler; a gas conduit connecting said fuel gas supply line with said feed line having a normally closed seventh motor valve therein; a carbon black recovery off-gas line connected with said fuel gas feed line having a normally open eighth motor valve therein; a fifth solenoid-operated 3-way valve operatively connected with said seventh and eighth motor valves; a second pressure switch in a second circuit with an electric power source operatively connected with said pressure sensing means on said oil header to acuate said fifth solenoid and reverse said seventh and eighth motor valves when pressure in said oil header varies from a selected range; a process air header in said conduit means connected with said first and second air supply lines and with said blower; a normally open ninth motor valve in said conduit means upstream of said air header; a first pressure controller responsive to the pressure in said air header operatively connected with said ninth motor valve; a normally open tenth motor valve in the steam line to said turbine operatively connected with said first pressure controller; a normally open eleventh motor valve in said fuel gas supply line downstream of said gas conduit; a second pressure controller responsive to the pressure in said fuel gas supply line in operative control of said eleventh motor valve, said first and second pressure controllers being operatively connected so that each operates the other when actuated; a third pressure switch in said first circuit between said first pressure switch and said power source responsive to said first pressure controller, adapted to cut off current to said first to fourth solenoids when process air pressure fails; and a fourth pressure switch in said first circuit intermediate said first pressure switch and said power source responsive to said second pressure controller; adapted to cut off current to said first to fourth solenoids when fuel gas pressure fails.

6. The system of claim 4 including a solenoid operated control means operatively connected with said first and second motor valves in a third circuit with said power source connected with said circuit intermediate said first and third power switches.

References Cited in the file of this patent

UNITED STATES PATENTS

| | | |
|---|---|---|
| 1,797,368 | Rumbarger | Mar. 24, 1931 |
| 2,785,960 | Ribble et al. | Mar. 19, 1951 |
| 2,883,271 | Pennington et al. | Apr. 21, 1959 |
| 2,886,567 | Wood | May 12, 1959 |

UNITED STATES PATENT OFFICE

CERTIFICATE OF CORRECTION

Patent No. 3,038,788 June 12, 1962

Edward N. Pennington et al.

It is hereby certified that error appears in the above numbered patent requiring correction and that the said Letters Patent should read as corrected below.

Column 8, line 46, before "circuit" insert -- first --.

Signed and sealed this 13th day of November 1962.

(SEAL)
Attest:

ERNEST W. SWIDER
Attesting Officer

DAVID L. LADD
Commissioner of Patents